Jan. 11, 1938.  E. MARTIN  2,105,089

MECHANICAL SYNCHRONIZING DEVICE

Filed May 7, 1936

INVENTOR.
Erle Martin
BY Harris G. Luther
ATTORNEY

Patented Jan. 11, 1938

2,105,089

UNITED STATES PATENT OFFICE 2,105,089

MECHANICAL SYNCHRONIZING DEVICE

Erle Martin, West Hartford, Conn., assignor to United Aircraft Corporation, East Hartford, Conn., a corporation of Delaware Application May 7, 1936, Serial No. 78,395

10 Claims. (Cl. 60—97)

This invention relates to a mechanism for synchronizing the speeds of a plurality of engines mounted upon a vehicle, such as an airplane, and has particular reference to a mechanical mechanism for maintaining the engines in a synchronous condition.

An object of the invention resides in the provision of a mechanical device or devices for maintaining one or more of a plurality of engines in synchronism with a master engine.

A further object resides in the provision of means for subjecting all of the engines to manual as well as automatic control.

A still further object resides in the provision in a synchronizing mechanism of the character described of means for disconnecting the synchronizer to avoid injury to the synchronizer or the speed controlling elements in case the engines are out of synchronism, by more than a predetermined degree.

An additional object resides in the provision in a synchronizing mechanism of the character described of means for automatically returning the synchronizing mechanism to its neutral or centered position after it has been actuated by a difference in the speeds of the engines to which it is operatively connected.

Other objects and advantages will be more distinctly pointed out hereinafter or will become apparent as the description proceeds.

In the accompanying drawing, in which like reference numerals are used to designate similar parts throughout, there is illustrated a suitable mechanical embodiment of what is now considered to be the preferred form of the idea of the invention. The drawing, however, is for the purpose of illustration only and is not to be taken as limiting the invention, the scope of which is to be measured entirely by the scope of the appended claims.

In the drawing, Fig. 1 is a schematic illustration showing the application of one unit of the improved mechanical synchronizing mechanism to two engines, the speeds of which it is desired to synchronize.

Figure 1:
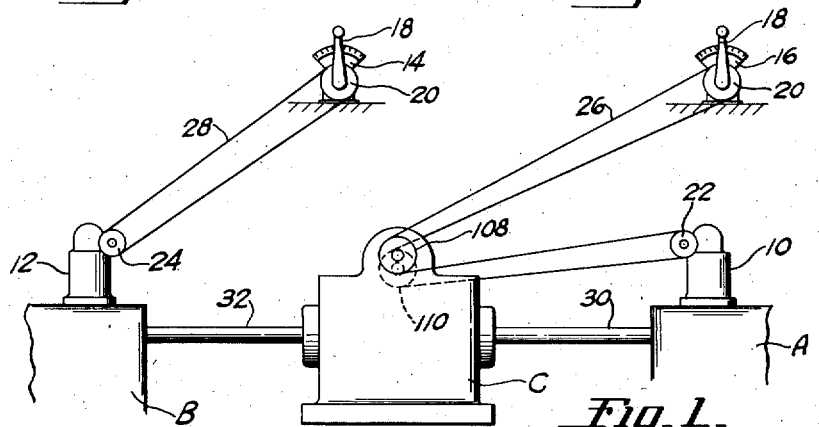
Figure 4:
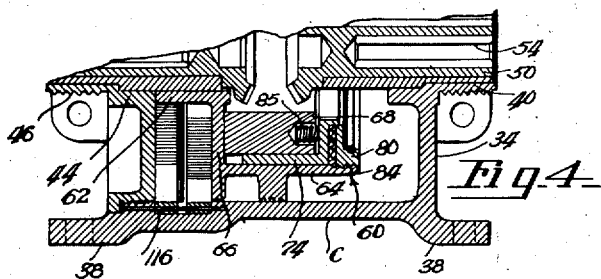
Fig. 4 is a fragmentary sectional view similar to Fig. 2 but showing the clutch mechanism somewhat rotated so as to section one of the clutch springs.

Referring to the drawing in detail and particularly to Fig. 1, the letter A designates one engine, the letter B the other engine, and the letter C generally designates a mechanical synchronizing unit interposed between the two engines. The engine A is provided with a speed regulating governor 10 which may act to control the speed of the engine A by controlling the pitch of a controllable pitch propeller in a manner well-known to the art. The speed of the engine B is similarly regulated by a governor indicated at 12. The governor 12 is subjected to manual control by means of a manually actuatable control element 14, and the governor 10 is similarly controlled by a manual control device 16. Each of the manual control devices includes a manually operable lever 18 connected to a pulley 20 over which passes a cable which also passes over a pulley as indicated at 22 in case of the governor 10, and 24 in the case of the governor 12, operatively connected with the governors to adjust the same. The cable used to adjust the governor 10 is indicated at 26, and the cable used to adjust the governor 12 is indicated at 28.

The mechanical synchronizing unit C is a form of differential mechanism and has its opposite ends operatively connected to the engines A and B by means of suitable shafts 30 and 32, which in the case of actual installations may be flexible tachometer shafts or other suitable power transmitting elements. The two shafts 30 and 32 are connected to the engines to rotate in opposite directions at the same speed when the engines are in synchronism.

Figures 2, 3:
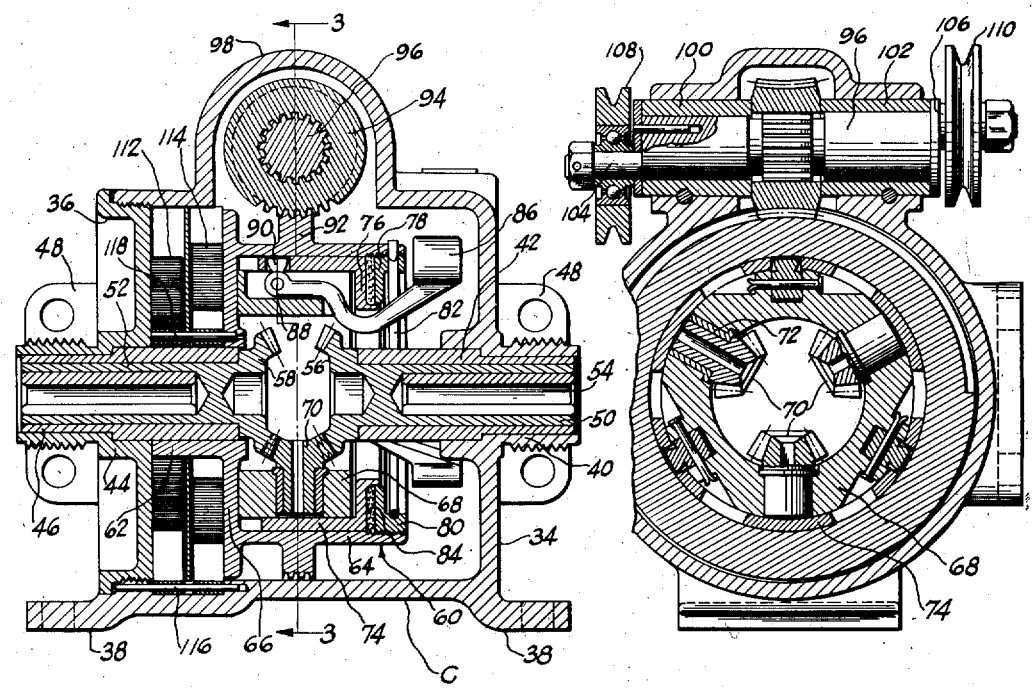
Fig. 2 is a longitudinal sectional view of the mechanical synchronizing mechanism unit illustrated in Fig. 1.
Fig. 3 is a sectional view on the line 3—3 of Fig. 2.

Referring to Fig. 2, the synchronizing unit C is shown to comprise a differential mechanism mounted in a suitable casing 34. This casing is generally cylindrical or cup-shaped in form and is permanently closed at one end, the other end being closed by a removable cover member 36 screw threaded into the open end of the casing. The casing is provided with a suitable base 38 by means of which it may be attached to some portion of the vehicle, such as an airplane, upon which the engines to be synchronized are mounted. The closed end of the casing is provided centrally thereof with an annular boss 40 which receives and retains a sleeve-like bearing member or bushing 42, the cover 36 being provided with a similar boss 44 which retains a similar bearing member or bushing 46, the bushing being clamped in the bosses by suitable means, such as the split clamps 48, screw threaded upon the externally projecting portions of the bosses. A gear shaft 50 is rotatably mounted in the bearing 42, and a similar gear shaft 52 is rotatably mounted in the bearing 46. Each gear shaft is provided in its outer end with a non-circular bore or well 54 which receives a driving connection from the respective shaft 30 or 32. A beveled gear 56 is formed integrally with the shaft 50 and is positioned within the casing 34 adjacent to the center thereof. A similar beveled gear 58 is formed integrally with the shaft 52 and faces the gear 56 on the interior of the casing. A ring member, generally indicated at 60, is rotatably mounted upon the inwardly projecting end of the bearing member 46 by means of a bearing sleeve portion 62. This ring member has an annular portion 64 connected to the bearing sleeve by an annular end portion 66 and contains within the annular portion a cage member 68, particularly illustrated in Fig. 3. In the form of the invention illustrated, the cage or spider member 68 is roughly triangular in shape and carries three radial pinion gears 70 rotatably mounted therein by means of suitable bearings, as indicated at 72. The three pinions 70 mesh with the two beveled gears 56 and 58, as clearly illustrated in Fig. 2. From the construction so far described, it will be observed that as long as the two gears 56 and 58 rotate in opposite directions at equal speeds, the pinions 70 will rotate between the two beveled gears, but there will be no movement of the cage 68, but if the speed of one of the gears 56 or 58 varies with respect to the speed of the other gear, the cage 68 will be caused to creep or rotate about the axis of the beveled gears.

An annular clutch member 74 is interposed between the exterior of the cage member 68 and the interior of the annular portion 64 of the ring member 60, and has at one end an inwardly directed radial flange portion 76 which faces a similar inwardly directed flange portion 78 of an annular member 80 screw threaded into the open end of the annular portion 64 of the member 60 and retained in adjusted position therein by suitable means, such as the snap ring 82. An annular disc of friction material 84 is interposed between the adjacent surfaces of the flanges 76 and 78 to provide a friction clutch connection between the members 74 and 80, which are urged toward each other in a manner well known in the clutch art as by suitable compression springs 85. The cage 68 is free to rotate within the annular portion 64 of the member 60 except for the driving connection effected by the frictional contact between the members 74 and 80. By reason of this frictional connection, if the rotation of the members 68 with respect to the member 60 becomes excessive, the clutch will slip before the synchronizing mechanism or the speed control elements or the driving shafts are injured.

In order to provide further for safe operation of the device, a plurality of centrifugal members 86 are pivotally connected to the cage 68, as indicated at 88 in Fig. 2. Each of these centrifugal members is provided adjacent to the pivot 88 with a tongue or detent 90 which projects into an aperture provided in the member 74. With this construction, if the difference in the speeds of the two gears 56 and 58 results in a rotation of the member 60, at a rate above a predetermined rate, for example twenty revolutions per minute, centrifugal force acting upon the members 86 will cause them to swing outwardly and move the member 74 to the left as viewed in Fig. 2 away from contact with the surface of the friction material 84, thus freeing the cage member 68 for rotation relative to the member 60. It will also be noted from an inspection of Fig. 2 that the detents 90 provide the driving connections between the cage member 68 and the clutch member 74.

Upon the exterior of the annular portion 64 of the member 60, there is provided a worm wheel 92 which engages with the teeth of a gear 94 mounted upon a shaft 96 which extends transversely through the upper portion of the casing 34 and is received in an upward extension 98 of the casing. The shaft is journaled in the extension 98 by means of suitable bushings 100 and 102 particularly illustrated in Fig. 3. From the above description it will be observed that any rotation of the member 60 incident to a difference in the speeds of the gears 56 and 58 by rotating the worm 92 will cause a rotation of the gear 94 and the shaft 96. At its opposite ends the shaft 96 is provided with eccentric journals, as indicated at 104 and 106, and upon these journals cable pulleys 108 and 110 are rotatably mounted.

Referring now to Fig. 3, it will be observed that the cable 26 from the manual control 16 to the governor 10 is carried over the pulleys 108 and 110, the cable 28 from the manual control 14 being led directly to the pulley 24 of the governor 12. This arrangement makes the engine B the master engine, the speed of which is manually regulated by the manual control 14. The governor 10 of the engine A is manually adjusted until its speed is approximately the same as the speed of the engine B. After this manual adjustment, minor adjustments to maintain the engine A exactly in synchronism with the engine B are effected automatically by the synchronizing unit C, since if the speed of the engine A varies with respect to that of the engine B, the shaft 96 of the synchronizing unit will be rotated to move the eccentric journals 104 and 106, which movement will result in pulling up on one side of the cable 26 and loosening the other side with a consequent minor adjustment of the pulley 22 of the governor A.

A pair of oppositely wound clock springs 112 and 114 are disposed within the casing 34 and connected at their outer ends to the casing by suitable means such as the pin 116, and at their inner ends to the member 60 by suitable means such as the pin 118. The force of these two springs being exerted in opposite directions, whenever the member 60 is rotated to adjust the speed of the engine A with respect to that of the engine B and the condition tending to rotate the member 60 is subsequently corrected, the springs 112 and 114 will assist in returning the member 60 to its central or neutral position and will tend to maintain the member in that position against the action of minor accidental forces.

While there has been illustrated and described a particular mechanical embodiment of what is now considered to be the preferred form of the invention, it is to be understood that the invention is not limited to the particular mechanical embodiment so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

What is claimed is:

1. A synchronizing device for matching the speeds of jointly operating engines provided with speed controlling mechanisms comprising, a differential mechanism having one side driven by one engine in one direction, and the other side driven by the other engine in the opposite direction, an intermediate portion driven by said differential sides when the speed of one engine differs from the speed of the other, means operatively connecting said intermediate portion with the speed controlling mechanism of at least one of said engines, and means for releasing the drive to said intermediate portion when the speeds of said engines differ by more than the predetermined amount.

2. In a mechanism for synchronizing the speed of a controlled motor with that of a master motor, a speed controlling device on said controlled motor, a differential mechanism driven by said motors and acting to displace an element operatively connected with said speed controlling device whenever the speeds of said motors differ, and means for releasing said speed controlling device from the displacing force of said differential mechanism whenever the speeds of said motors differ by more than a predetermined amount.

3. In a mechanism for synchronizing the speed of a plurality of controlled motors with that of a master motor, a speed controlling device on each of said controlled motors, a differential mechanism between each of said controlled motors and said master motor, a displaceable element operatively associated with each of said differential mechanisms and operatively connected with the speed controlling device of the respective controlled motor, said displaceable elements being moved to operate the respective speed control devices whenever the speed of the respective controlled motors differ from the speed of the master motor, and means for releasing each of said displaceable devices from the displacing force exerted by the respective differential mechanism when the speed of the respective controlled motor differs from the speed of the master motor by more than a predetermined amount.

4. In a mechanism for synchronizing the speed of a controlled engine with that of a master engine, a speed controlling device on said controlled engine, a differential mechanism disposed between said engines having one gear driven in one direction by said master engine, and another gear driven in the opposite direction by said controlled engine, pinion gears between said engine driven gears, a cage supporting said pinion gears and movable therewith upon a variation in the speed of said controlled engine with respect to the speed of the master engine, a ring member surrounding said cage and operatively associated with the speed controlling mechanism on said controlled engine, a friction drive between said cage and said ring, and centrifugally actuated means for releasing said friction drive whenever the speed of said controlled engine varies from the speed of said master engine by more than a predetermined amount.

5. In a mechanism for synchronizing the speed of a controlled engine with that of a master engine, a speed controlling device on said controlled engine, a differential mechanism disposed between said engines having one gear driven in one direction by said master engine and another gear driven in the opposite direction by said controlled engine, pinion gears between said engine driven gears, a cage supporting said pinion gears and movable therewith upon a variation in the speed of said controlled engine with respect to the speed of the master engine, a ring member surrounding said cage and operatively associated with the speed controlling mechanism on said controlled engine, a friction drive between said cage and said ring, centrifugally actuated means for releasing said friction drive whenever the speed of said controlled engine varies from the speed of said master engine by more than a predetermined amount, and means for automatically returning said ring to its central or neutral position after it has been displaced from such position by variation in the speed of the controlled engine with respect to the speed of the master engine.

6. In a mechanism for synchronizing the speed of a controlled engine with the speed of a master engine, a centrifugally actuated governor on each engine, a differential mechanism disposed between said engines and having its opposite sides driven by said engines, and a displaceable member operatively connected with the governor of said controlled engine and associated with said differential mechanism to be displaced by said differential mechanism upon a variation in the speed of the controlled engine with respect to the speed of the master engine.

7. In a mechanism for synchronizing the speed of a controlled engine with that of a master engine, a centrifugally actuated governor upon each engine, a manual control for each governor, a differential mechanism disposed between said engines and driven thereby, and means associated with said differential mechanism and actuated thereby upon a variation in the speed of the controlled engine with respect to the speed of the master engine interposed in the manual control to said controlled engine to vary the action of the controlled engine governor upon a variation in the speed of the controlled engine with respect to the speed of the master engine.

8. In a mechanism for synchronizing the speed of a controlled engine with that of a master engine, a governor for each engine, a manual control for each governor, a cable connecting each manual control with the respective governor, a differential mechanism interposed between said engines and driven thereby, and means applied to the cable connecting the governor of said controlled engine with the respective manual control and actuated by said differential mechanism upon a variation in the speed of said controlled engine with respect to the speed of said master engine to vary the action of the governor of said controlled engine without varying the manual control for said controlled engine.

9. In a mechanism for synchronizing the speed of a controlled engine with that of a master engine, a speed controlling governor for each engine, a pulley on each governor for changing the action of the governor and varying the speed of the engine, a manual control for each governor, a cable connecting each manual control with the pulley of the respective governor whereby both of said governors may be manually controlled to vary the engine speed, and means applied to the cable connecting the governor of the controlled engine with the respective manual control and actuated by variations in the speed of said controlled engine with respect to the speed of said master engine to change the tension in the opposite sides of said cable and thereby provide minor adjustments to the governor of said controlled engine to maintain the speed of said controlled engine in synchronism with the speed of said master engine.

10. In a mechanism for synchronizing the speed of a controlled engine with that of a master engine, a speed controlling governor for each engine, a puley on each governor for changing the action of the governor and varying the speed of the engine, a manual control for each governor, a cable connecting each manual control with the pulley of the respective governor whereby both of said governors may be manually controlled to vary the engine speed, and means applied to the cable connecting the governor of the controlled engine with the respective manual control, and actuated by variations in the speed of said controlled engine with respect to the speed of said master engine to change the tension in the opposite sides of said cable, and thereby provide minor adjustments to the governor of said controlled engine to maintain the speed of said controlled engine in synchronism with the speed of said master engine, said means comprising a shaft driven by a differential mechanism drivingly connected with said engines and having eccentrically mounted pulleys upon the opposite ends thereof, the opposite sides of the cable being led over said pulleys.

ERLE MARTIN.

DISCLAIMER 2,105,089.—*Erle Martin*, West Hartford, Conn. MECHANICAL SYNCHRONIZING DEVICE. Patent dated January 11, 1938. Disclaimer filed February 20, 1939, by the assignee, *United Aircraft Corporation*; the patentee consenting and approving.

Hereby enters this disclaimer to claims 6, 7, and 8 of said Letters Patent.

[*Official Gazette March 21, 1939.*]

of a controlled engine with that of a master engine, a speed controlling governor for each engine, a puley on each governor for changing the action of the governor and varying the speed of the engine, a manual control for each governor, a cable connecting each manual control with the pulley of the respective governor whereby both of said governors may be manually controlled to vary the engine speed, and means applied to the cable connecting the governor of the controlled engine with the respective manual control, and actuated by variations in the speed of said controlled engine with respect to the speed of said master engine to change the tension in the opposite sides of said cable, and thereby provide minor adjustments to the governor of said controlled engine to maintain the speed of said controlled engine in synchronism with the speed of said master engine, said means comprising a shaft driven by a differential mechanism drivingly connected with said engines and having eccentrically mounted pulleys upon the opposite ends thereof, the opposite sides of the cable being led over said pulleys.

ERLE MARTIN.

DISCLAIMER 2,105,089.—*Erle Martin*, West Hartford, Conn. MECHANICAL SYNCHRONIZING DEVICE. Patent dated January 11, 1938. Disclaimer filed February 20, 1939, by the assignee, *United Aircraft Corporation*; the patentee consenting and approving.

Hereby enters this disclaimer to claims 6, 7, and 8 of said Letters Patent.

[*Official Gazette March 21, 1939.*]

DISCLAIMER 2,105,089.—*Erle Martin*, West Hartford, Conn. MECHANICAL SYNCHRONIZING DEVICE. Patent dated January 11, 1938. Disclaimer filed February 20, 1939, by the assignee, *United Aircraft Corporation*; the patentee consenting and approving.

Hereby enters this disclaimer to claims 6, 7, and 8 of said Letters Patent.

[*Official Gazette March 21, 1939.*]